United States Patent
Lovett (10) Patent No.: US 10,233,867 B2
(45) Date of Patent: Mar. 19, 2019

(54) GAS TURBINE ENGINE SYSTEM FOR MODULATING FLOW OF FAN BY-PASS AIR AND CORE ENGINE AIR

(71) Applicant: UNITED TECHNOLOGIES CORPORATION, Hartford, CT (US)

(72) Inventor: Jeffrey A. Lovett, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 533 days.

(21) Appl. No.: 14/902,899

(22) PCT Filed: Jun. 26, 2014

(86) PCT No.: PCT/US2014/044303
§ 371 (c)(1),
(2) Date: Jan. 5, 2016

(87) PCT Pub. No.: WO2015/002805
PCT Pub. Date: Jan. 8, 2015

(65) Prior Publication Data
US 2016/0153397 A1 Jun. 2, 2016

Related U.S. Application Data

(60) Provisional application No. 61/843,209, filed on Jul. 5, 2013.

(51) Int. Cl.
*F02K 3/075* (2006.01)
*F02K 1/46* (2006.01)
(Continued)

(52) U.S. Cl.
CPC .............. *F02K 1/08* (2013.01); *F01D 17/143* (2013.01); *F01D 17/148* (2013.01); *F02K 1/15* (2013.01);
(Continued)

(58) Field of Classification Search
CPC ............... F02K 3/075; F01K 1/46; F01K 1/48
See application file for complete search history.

(56) References Cited

U.S. PATENT DOCUMENTS 3,153,904 A * 10/1964 Ellis ........................ F02K 3/075
60/244
4,072,008 A * 2/1978 Kenworth ............... F02K 3/075
60/262

(Continued)

FOREIGN PATENT DOCUMENTS

| DE | 2 372 779 | 9/2002 |
|---|---|---|
| GB | 2372779 A | 9/2002 |
| JP | 2006090685 A | 4/2006 |

OTHER PUBLICATIONS

International preliminary report on patentability for application No. PCT/US2014/044303 dated Jun. 26, 2014.

(Continued)

*Primary Examiner* — Todd E Manahan
*Assistant Examiner* — Rene Ford
(74) *Attorney, Agent, or Firm* — Bachman & LaPointe, PC (57) ABSTRACT

The system (10) provides a modulator ring (54) secured adjacent an exhaust end (56) of an inner wall of a by-pass fan air duct (40) and secured adjacent a convergent nozzle section (38) of the engine wherein flow of by-pass fan air (42) and core engine air (18) converge within an exhaust nozzle (34), The modulator ring (54) may be actuated to extend beyond the exhaust end (56) of the duct (40) to decrease air passage (62) forcing more air into the core engine (14) for greater thrust from the core engine (14) with minimal loss of thrust from the by-pass fan air (42). The modulator ring (54) stay alternatively rotate to uncover (Continued)

trailing-edge slots in the exhaust end (56) of the duct to also modulate flow rates of by-pass fan air (42) into the convergent nozzle section (38).

5 Claims, 4 Drawing Sheets (51) Int. Cl.
    *F02K 1/48*     (2006.01)
    *F02K 1/08*     (2006.01)
    *F02K 1/15*     (2006.01)
    *F02K 1/38*     (2006.01)
    *F01D 17/14*     (2006.01)
    *F02K 3/10*     (2006.01)

(52) U.S. Cl.
    CPC ................ *F02K 1/386* (2013.01); *F02K 1/46* (2013.01); *F02K 1/48* (2013.01); *F02K 3/075* (2013.01); *F02K 3/10* (2013.01); *F05D 2250/182* (2013.01); *F05D 2250/41* (2013.01); *F05D 2270/62* (2013.01)

(56) References Cited

U.S. PATENT DOCUMENTS

| | | | | |
|---|---|---|---|---|
| 4,086,761 | A | | 5/1978 | Schaut et al. |
| 5,136,840 | A | * | 8/1992 | Nash .............. F02C 9/18 60/226.3 |
| 5,157,917 | A | | 10/1992 | Liang et al. |
| 5,307,624 | A | * | 5/1994 | Even-Nur .............. F02K 3/075 60/226.3 |
| 5,347,807 | A | * | 9/1994 | Brossier .............. F02K 3/075 137/15.1 |
| 5,687,562 | A | * | 11/1997 | Stewart .............. F01D 17/105 251/304 |
| 6,021,637 | A | * | 2/2000 | Scavo .............. F02K 1/30 239/265.17 |
| 8,967,952 | B2 | * | 3/2015 | Jones .............. F01D 17/141 415/127 |
| 9,341,075 | B2 | * | 5/2016 | Christians .............. F01D 17/141 |
| 2005/0129501 | A1 | * | 6/2005 | Coull .............. F23R 3/26 415/1 |
| 2006/0053769 | A1 | | 3/2006 | Feuillard et al. |
| 2006/0150612 | A1 | | 7/2006 | Anderson et al. |
| 2012/0128467 | A1 | * | 5/2012 | Ruthemeyer .............. F01D 5/146 415/115 |
| 2012/0279198 | A1 | * | 11/2012 | Erickson .............. F02K 3/075 60/226.3 |

OTHER PUBLICATIONS

European search report for application No. 14820627.9-1607 dated Jun. 22, 2016.
European office action for Application No. 14 820 627.9-1607 dated Dec. 4, 2017.

* cited by examiner

GAS TURBINE ENGINE SYSTEM FOR MODULATING FLOW OF FAN BY-PASS AIR AND CORE ENGINE AIR

CROSS-REFERENCE TO RELATED APPLICATION

This Application claims the benefit of U.S. Provisional Patent Application Ser. No. 61/843,209 that was filed on Jul. 5, 2013, entitled "GAS TURBINE ENGINE SYSTEM FOR MODULATING FLOW OF FAN BY-PASS AIR AND CORE ENGINE AIR."

TECHNICAL FIELD

The present disclosure relates to a gas turbine engine system for changing relative amounts of fan by-pass and core engine air passing through a by-pass fan air duct and an engine core to increase engine operating efficiencies through varying flight conditions.

BACKGROUND ART

In the field of gas turbine engines it is known that thrust is generated by combustion of a pressurized fuel and air mixture within a combustor of an engine core and discharge of the expanded, combusted fuel air mixture through a high-pressure and low-pressure turbine and out of the core engine through a variable discharge exhaust nozzle. Thrust is also generated by a rotating fan at an entry end of the engine. The fan is rotated, such as by the low pressure turbine or compressor, and by-pass air passing downstream from the fan is directed through a by-pass fan air duct that surrounds the engine core and discharges the by-pass air into the core engine air within the exhaust nozzle.

When a greatest amount of thrust is required, such as at take-off and ascent to a cruising altitude it is known that maximizing a fuel-air mixture within the combustors will produce the greatest amount of thrust. During such a take-off and ascent, it is known that by-pass air may be directed down a fan duct to cool the by-pass air duct and then exit into the core engine. However, at cruise altitude, less thrust is required. Therefore, to conserve fuel, the amount of fuel-air mixture delivered to the combustor is decreased and the by-pass fan air is increased and is directed to flow completely through the by-pass fan air duct so that a greater amount of thrust is contributed by the rotating fan in such a by-pass turbo fan gas turbine engine. Many problems are associated with varying flow of by-pass fan air into the core engine.

For example, U.S. Pat. No. 5,136,840 that issued on Aug. 11, 1992 to Nash shows channeling of by-pass air from a by-pass duct into an engine augmentor (or afterburner) through slots located at the upstream end of the augmentor. Varying the amount of air directed from the by-pass duct is performed by a complex actuation system that utilizes pivot arms and a ring sleeve with corresponding slots. This approach produces a substantial decrease in available thrust from both the fan and augmentor by having the by-pass air turn at ninety-degrees from within the by-pass duct into the augmentor, thereby disrupting linear flow of the exhaust stream which results in a pressure drop in both the by-pass air and core fuel air mixture within the augmentor. Additionally, substantial thrust may be lost from the fan air stream because complex actuators partially within the duct are required to rotate the sleeve valve. The same problems arise in U.S. Pat. No. 5,307,624 that issued on May 3, 1994 to Even-Nur et al., wherein a different actuator is utilized as part of a valve to direct by-pass air from a by-pass duct into an entry of an augmentor.

More recently, U.S. Pat. No. 8,181,441 that issued on May 22, 2012 to Smith (and that is owned by the owner of all rights in the present disclosure, and is incorporated herein by reference thereto) discloses a circumferentially rotating liner defining at least one aperture and disposed to rotate about a compressor section of a core engine for selectively admitting variable amounts of by-pass air from the by-pass duct through the aperture and into the core engine. This disclosure also produces substantial pressure drops within both of the by-pass air duct and core engine by having the by-pass air directed through an aperture to enter the core engine flow at a direction essentially normal to the core engine flow. Additionally, the sleeve valve actuator produces a pressure drop within the by-pass duct flow. Even more recently, U.S. Pat. No. 8,235,646 that issued on Aug. 7, 2012 to Lace discloses a variable area nozzle that changes its air passage area by extension and retraction into a by-pass fan duct of a fairing having one end slidably secured to an inner wall of the by-pass fan air duct and having an opposed end beneath the inner wall and actuated by a complex actuating mechanism. The fairing structure of Lace produces a very substantial loss of thrust in the by-pass fan duct, and involves a high degree of complexity in the actuating mechanism.

Therefore, there is a need for an improved, efficient gas turbine engine system for varying proportions of flow of by-pass fan air through a by-pass fan air duct and an engine core, and which minimizes pressure losses in mixing the air streams.

SUMMARY OF THE INVENTION

The disclosure is a gas turbine engine system for modulating flow of by-pass fan air and core engine air. The system includes a gas turbine engine having an engine core defining passageways for directing flow of the core engine air sequentially through a compressor, a combustor wherein the air is combusted with a fuel, a high pressure turbine, a low pressure turbine, out of the engine core, and optionally through and out of an augmentor, and out an engine convergent nozzle section downstream from the low pressure turbine. The gas turbine engine also includes a by-pass fan air duct for directing flow of by-pass fan air from a fan rotated upstream of the compressor by the core engine, through the by-pass fan air duct surrounding the engine core and optional augmentor and out of an exhaust end of the fan air duct before the engine convergent nozzle section. The by-pass fan air duct also directs flow of by-pass fan air in a parallel linear direction with the flow of core engine air downstream from the low pressure turbine and within the engine convergent nozzle section. The system also includes a modulator ring that is selectively secured to surround an inner wall of the by-pass air duct adjacent to an exhaust end of the inner wall of the by-pass air duct and upstream from and adjacent the engine convergent nozzle section. A positional actuator is mechanically linked to the modulator ring for selectively positioning the modulator ring to one of circumferential rotation about and overlying the exhaust end of the inner wall of the by-pass air duct, and longitudinal sliding along and beyond the exhaust end of the inner wall of the by-pass air duct to modulate flow of by-pass air into the combusted core engine air flow within the convergent nozzle section. By injecting the fan by-pass air at the position where the engine nozzle convergent nozzle section is turning the flow inward toward a core axis, pressure loss of mixing non-parallel exhaust air streams is avoided.

In an embodiment of the gas turbine engine system, the exhaust end of the by-pass fan air duct defines an air-duct exhaust passage between a downstream end of the modulator ring and a convergent wall of the convergent nozzle section of the engine. The air-duct exhaust passage defines an area open to flow of by-pass air through the air duct exhaust passage. The area of the air duct exhaust passage is reduced by between about zero percent and about eighty percent as the downstream end of the modulator ring slides beyond the exhaust end of the inner wall of the by-pass air duct and as an upstream end of the modulator ring does not extend beyond the exhaust end of the inner wall of the by-pass air duct. This changing of the area of the air-duct exhaust passage effectively modulates (meaning increases or decreases a rate of) flow of the by-pass air through the air duct exhaust passage and into the flow of the combusted core engine air within the convergent section of the gas turbine engine nozzle. If the rate of flow of the by-pass air passing through the air-duct passage is reduced, more fan air will be directed to flow as core engine air through the engine core.

In another aspect of the gas turbine engine system, a downstream end of the modulator ring defines a curved shape to assist in turning the fan air flow and to minimize shear losses.

In a further aspect, the gas turbine engine system, the positional actuator includes a linear actuator and a lever arm which pivots about a hinge.

In a particular embodiment of the gas turbine engine system, the exhaust end of the inner wall of the by-pass air duct defines a plurality of trailing-edge slots extending from the exhaust end upstream toward the low pressure turbine, and extending no further than an upstream end of the overlying modulator ring. The modulator ring also defines a corresponding plurality of trailing-edge slots extending from a downstream end of the modulator ring upstream toward but not extending beyond the upstream and of the modulator ring. Additionally, a blocking area of the modulator ring is included between each of the plurality of trailing-edge slots defined within the modulator ring, and each blocking area is greater than an area of each of the trailing-edge slots defined within the inner wall of the by-pass air duct. Therefore, whenever the modulator ring is selectively rotated to a restricted position the blocking areas of the modulator ring between each of the plurality of trailing-edge slots completely overlies each of the plurality of trailing-edge slots defined within the exhaust end of the inner wall of the by-pass air duct. Additionally, whenever the modulator ring is selectively rotated to an unrestricted position, the plurality of trailing-edge slots defined within the modulator ring overlies the plurality of trailing-edge slots defined within the inner wall of the by-pass air duct creating additional area for fan air flow. The positional actuator is configured to selectively move the modulator ring from the restricted position to the unrestricted position, thereby modulating flow of the by-pass air to pass either beyond the downstream end of the modulator ring or to pass partially through the plurality of trailing-edge slots defined within the modulator ring and exhaust end of the inner wall of the by-pass air duct and into the flow of the combusted core engine air within the convergent nozzle section of the gas turbine engine.

In a further aspect of the gas turbine engine system, the exhaust end of the by-pass fan air duct including the trailing-edge slots defines an air-duct exhaust passage between the downstream end of the modulator ring and a convergent wall of the convergent nozzle section. The air duct exhaust passage defines an area open to flow of by-pass air through the air duct exhaust passage. The area of the air duct exhaust passage is decreased by between about zero percent and about eighty percent as the modulator ring is rotated from the unrestricted position to the restricted position wherein trailing-edge slots in the downstream end of the modulator ring are positioned to cover the trailing-edge slots in the exhaust end of the by-pass fan air duct.

In a related aspect of the gas turbine engine system, the plurality of trailing-edge slots defined within the inner wall of the by-pass air duct and the corresponding plurality of trailing-edge slots defined within the downstream end of the modulator ring are in the shape of triangles, wherein each triangle has its base adjacent and defining the exhaust end and downstream end of the inner wall and modulator ring, and each triangle has a convergent point of two sides of each triangle farthest away from the exhaust end and downstream end of the inner wall and modulator ring.

The disclosure also includes a method of modulating flow of by-pass fan air and core engine air within the gas turbine engine system for minimizing loss of thrust generated by the rotating fan, and maximizing cooling of a convergent wall of the convergent nozzle section of the gas turbine engine. The method includes positioning the modulator ring to surround the inner wall of the by-pass air duct adjacent the exhaust end of the inner wall and adjacent the convergent nozzle section; reducing an area of an air-duct passage by selectively moving the modulator ring to one of circumferential rotation about and overlying the exhaust end of the inner wall of the by-pass air duct, and longitudinal sliding along and beyond the exhaust end of the inner wall of the by-pass air duct; and, parallel linear flowing of the by-pass fan air and the core engine air into the convergent nozzle section.

The method may also include reducing the area of the air-duct passage by sliding the modulator ring so that as a downstream end of the modulator ring slides beyond the exhaust end of the inner wall of the by-pass air duct and as an upstream end of the modulator ring does not extend beyond the exhaust end of the inner wall of the by-pass air duct, flow of the by-pass fan air through the reduced area air-duct passage into the convergent nozzle section remains as parallel linear with flow of the core engine air into the convergent nozzle section.

Another aspect of the method of modulating flow of the by-pass fan air and core engine air includes selectively varying the area of the air-duct passage by positioning a plurality of trailing-edge slots defined within the exhaust end of the inner wall of the by-pass air duct and adjacent the convergent nozzle section of the gas turbine engine, and by circumferentially rotating the modulator ring so that a plurality of trailing-edge slots defined within and at a downstream end of the modulator ring and adjacent the convergent nozzle section of the gas turbine engine selectively overlie the trailing-edge slots defined within the exhaust end of the inner wall of the by-pass air duct. This permits flow of the by-pass fan air to pass through the overlying plurality of trailing-edge slots into the convergent nozzle section and to remain as parallel linear with flow of the core engine air into the convergent nozzle section. The flow of the by-pass fan air passing through the increased area air-duct passage remains as parallel linear because the plurality of trailing-edge slots defined within the downstream end of the modulator ring and within the exhaust end of the duct define the ends and therefore do not present any obstruction to flow of the by-pass fan air passing through the trailing-edge slots into the convergent nozzle section.

Accordingly, it is a general purpose of the present disclosure to provide a gas turbine engine system for modulating flow of fan by-pass air and core engine air that overcomes deficiencies of the prior art.

It is a more specific purpose of the present disclosure to provide a gas turbine engine system for modulating flow of fan by-pass air and core engine air that minimizes loss of thrust generated by the rotating fan and combusted fuel, and that maximizes cooling of a convergent wall of a convergent nozzle section of the gas turbine engine as flow of fan by-pass and core engine air are modulated. These and other purposes and values of the present disclosure will become apparent in the following detailed description and the accompanying drawings.

DESCRIPTION OF THE PREFERRED EMBODIMENTS

Figure 1:
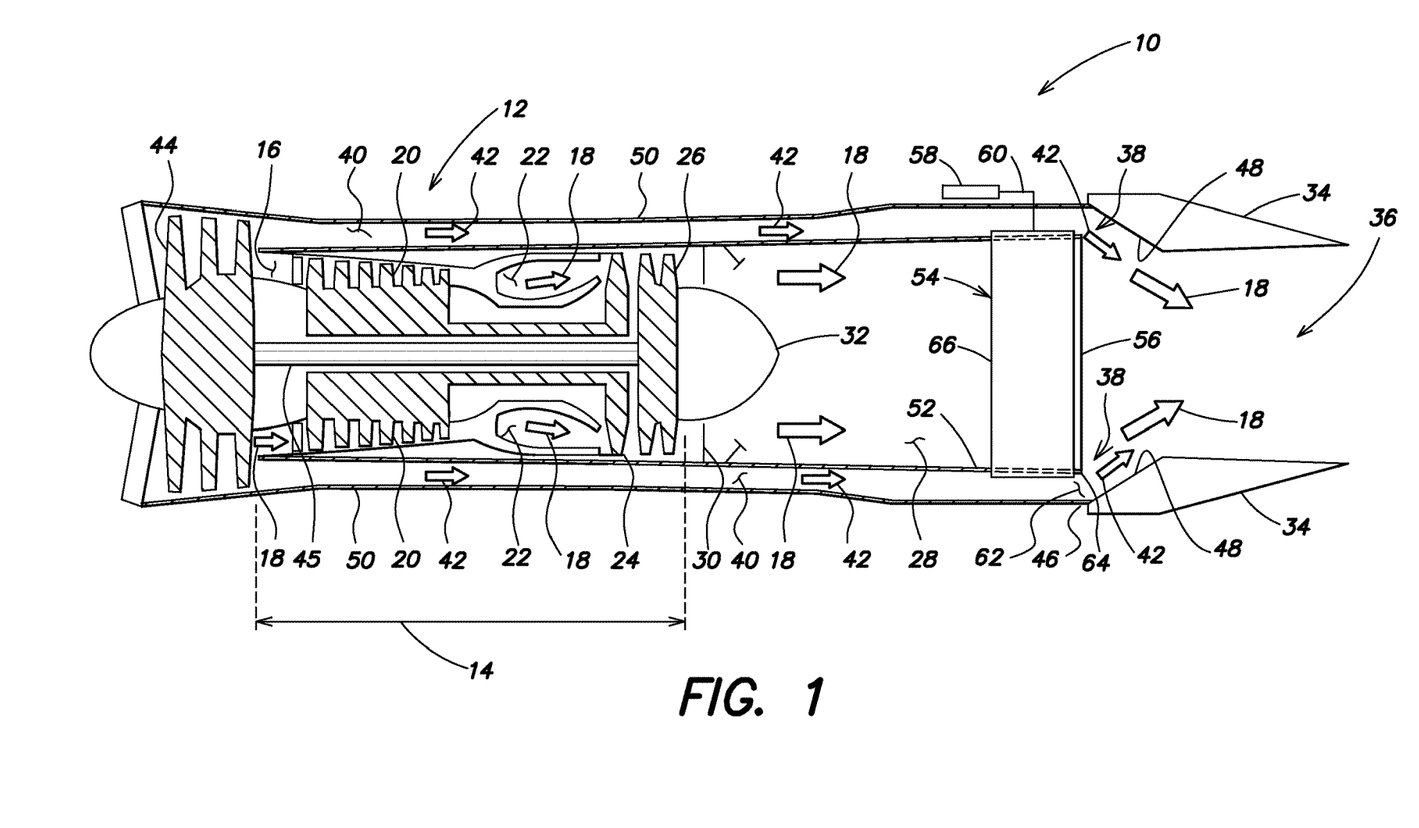
FIG. 1 is a simplified schematic cross-sectional drawing showing a gas turbine engine system constructed in accordance with the present invention and showing a modulator ring secured to surround an exhaust end of an inner wall of a by-pass air duct.

Referring to the drawings in detail, FIG. 1 shows a simplified schematic cross-sectional drawing showing a gas turbine engine system for modulating flow of fan by-pass air and core engine air constructed in accordance with the present disclosure and generally designated by the reference numeral 10. The system includes a gas turbine engine 12 having an engine core 14 defining passageways 16 for directing flow of the core engine air (represented by flow arrows designated with reference numeral 18) sequentially through a compressor 20, a combustor 22 wherein the air is combusted with a fuel. The combusted engine core air then passes through and rotates a high pressure turbine 24, a low pressure turbine 26, and then passes out of the engine core 14. Optionally, the engine core air 18 may then pass through an augmentor 28 (as shown in FIG. 1) or "afterburner", wherein additional fuel and air are admitted and ignited by an ignition ring 30 to produce additional thrust, as commonly found in military engines. Alternatively, the core engine air 18 may flow over a tail cone 32 and pass directly out of the core engine 14 with no augmentor 28 (not shown) and then into an exhaust nozzle 34 defining an adjustable engine discharge 36. The exhaust nozzle 34 includes an engine convergent nozzle section 38 downstream from the low pressure turbine 26 and optional augmentor 28.

The gas turbine engine 12 also includes a by-pass fan air duct 40 for directing flow of by-pass fan air (represented by flow arrows designated with reference numeral 42) from a fan 44 mechanically rotated by the core engine 12, such as through a shaft 45 extending between the low pressure turbine 26 and the fan 44, or by mechanical gearing from the compressor 20 (not shown) or other fan 44 rotating mechanisms known in the art. The by-pass fan air duct 40 surrounds the engine core 14 and any optional augmentor 28, and directs flow of the by-pass fan air 42 through the duct 40 and out of an exhaust end 46 of the fan air duct at a convergent wall 48 of the engine convergent nozzle section 38, wherein the core engine air 18 and by-pass fan air 42 converge. The by-pass fan air duct 40 is defined by a duct outer wall 50 and inner wall 52 of the duct 40.

The by-pass fan air duct 40 also directs flow of by-pass fan air 42 in a parallel linear direction with the flow of core engine 18 air downstream from the low pressure turbine 26, within any augmentor 28, and within the engine convergent nozzle section 38, as shown by flow arrows 18 and 42. (By the phrase "downstream from the low pressure turbine 26", it is meant to define an area away from the low pressure turbine 26 and in the direction of the flow of core engine air 42 and the by-pass fan air 18 toward the engine convergent nozzle section 38. By the phrase "parallel linear direction", it is meant that both the by-pass fan air flow 42 within the duct 40 and also the engine core air flow 18 downstream from the low pressure turbine 26 essentially flow parallel to each other, both flow in the same direction, and that the flow of both is free of any non-linear, turbulent flow that would be generated by mixing streams flowing in different directions.

The system 10 also includes a modulator ring 54 that is selectively secured to surround the inner wall 52 of the by-pass air duct 40 adjacent to an exhaust end 56 of the inner wall 52 of the by-pass air duct 40 and adjacent the engine convergent nozzle section 38. A positional actuator 58 is mechanically linked by an activating arm 60 to the modulator ring 54 for selectively positioning the modulator ring 54 to one of circumferential rotation about and overlying the exhaust end 56 of the inner wall 52 of the by-pass air duct 40, and longitudinal sliding along and beyond the exhaust end 56 of the inner wall 52 of the by-pass air duct 40 to modulate flow of by-pass air 42 into the combusted core engine air 18 flow within the convergent nozzle section 38.

In an embodiment of the gas turbine engine system 10, the exhaust end 46 of the by-pass fan air duct defines an air-duct exhaust passage 62 between a downstream end 64 of the modulator ring 54 and a convergent wall 48 of the convergent nozzle section 38 of the engine 12. The air-duct exhaust passage 62 defines an area open to flow of by-pass air 42 through the air duct exhaust passage 62. FIG. 1 shows the air-duct exhaust passage 62 having an area that is as large as possible because the downstream and 64 of the modulator ring 54 is upstream or adjacent the exhaust end 56 of the inner wall 52.

Figure 2:
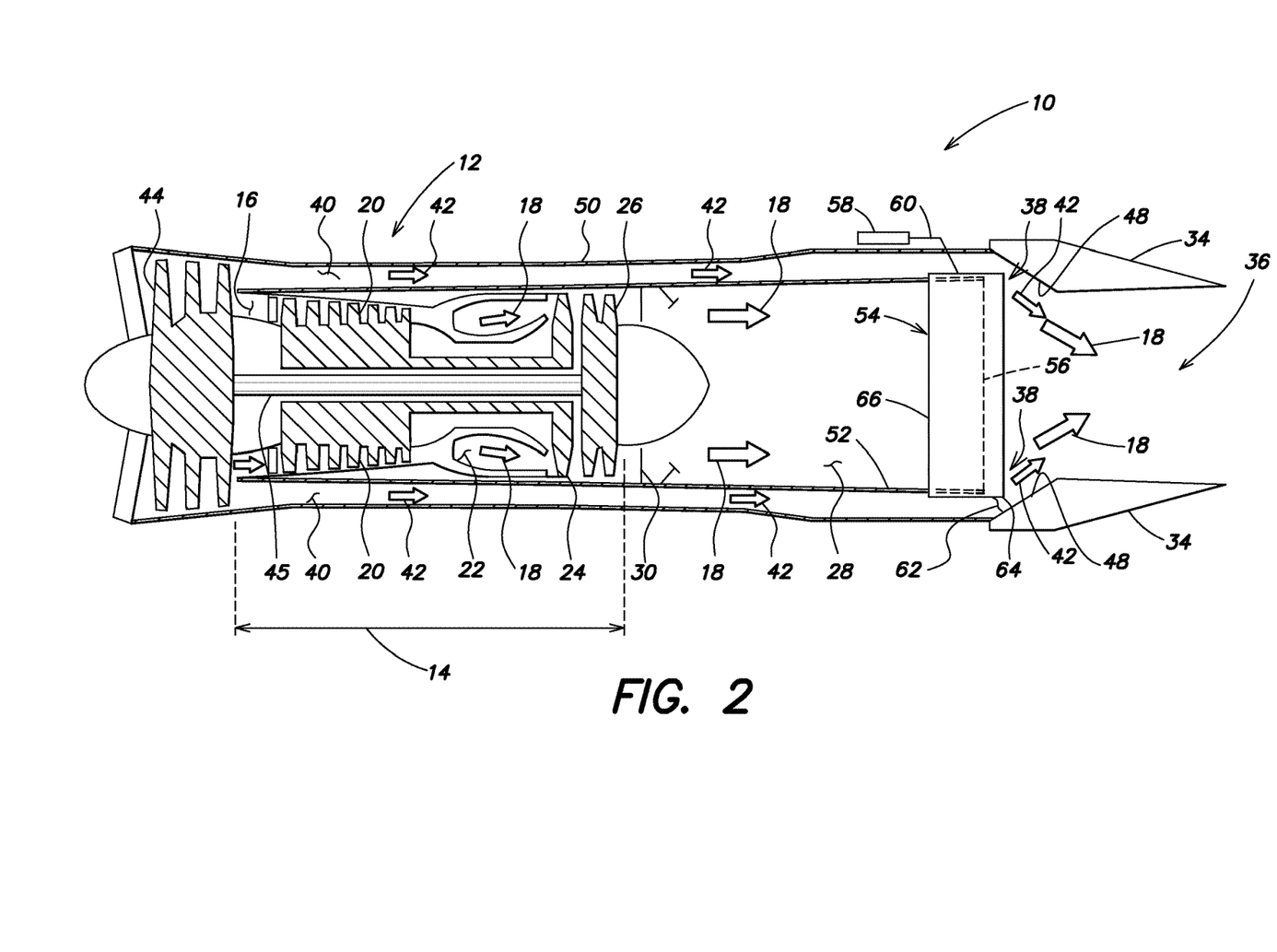
FIG. 2 is a simplified schematic cross-sectional drawing of the FIG. 1 gas turbine engine system showing the modulator ring extended beyond the exhaust end of an inner wall of a by-pass air duct.

FIG. 2 shows the FIG. 1 gas turbine engine system 10, wherein the area of the air duct exhaust passage 62 is reduced by about up to eighty percent as the downstream end 64 of the modulator ring 54 slides beyond the exhaust end 56 of the inner wall 52 of the by-pass air duct 40 and as an upstream end 66 of the modulator ring 54 does not extend beyond the exhaust end 56 of the inner wall 52 of the by-pass air duct 40. This changing of the area of the air-duct exhaust passage 62 effectively modulates (meaning increases or decreases a rate of) flow 42 of the by-pass air through the air duct exhaust passage 62 and into the flow 18 of the combusted core engine air within the convergent nozzle section 38 of the gas turbine engine 12. If the rate of flow of the by-pass air 42 passing through the air-duct exhaust passage 62 is reduced, more fan air flow 42 will be directed to flow as core engine air 18 through the engine core 14.

Figure 3:
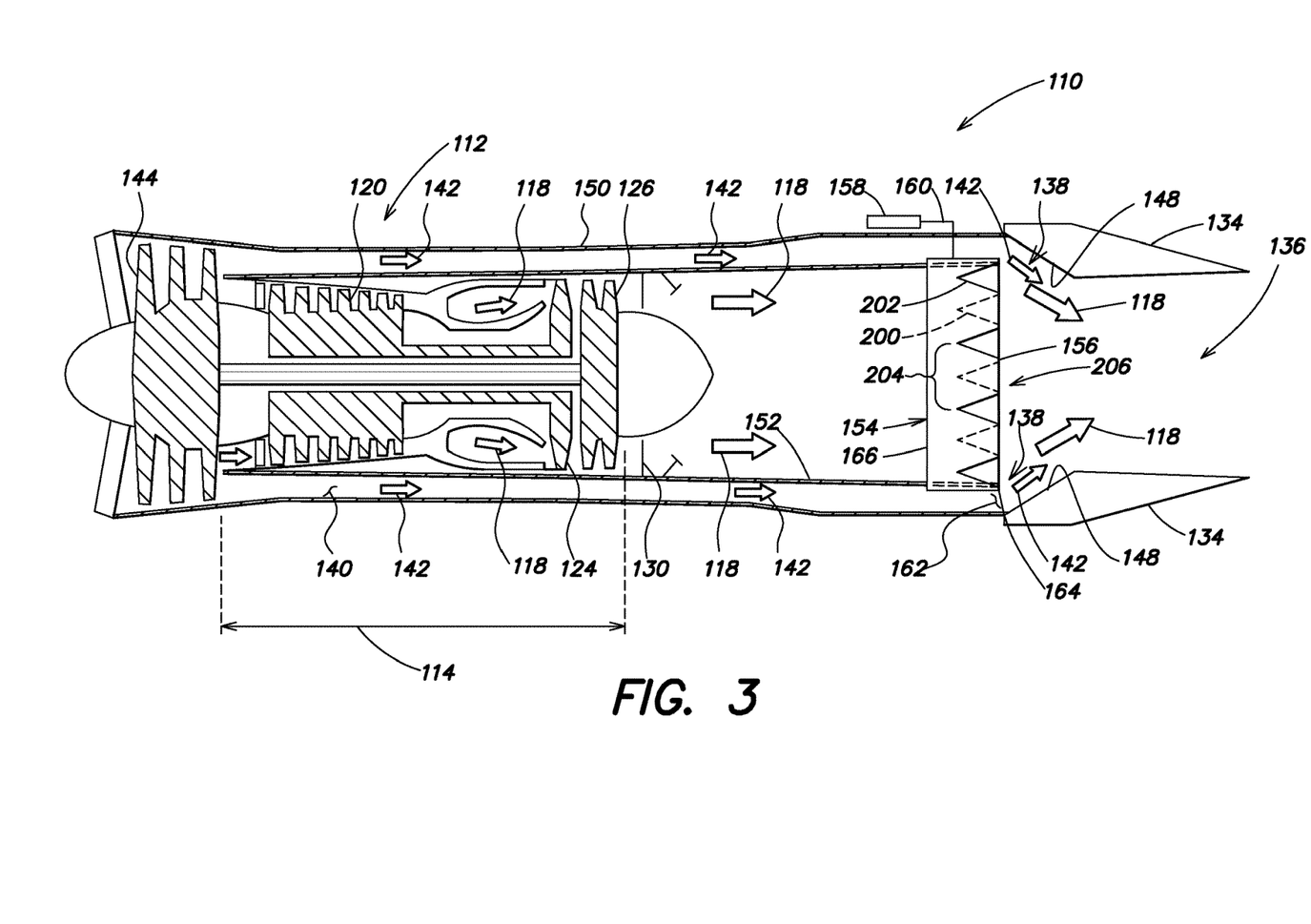
FIG. 3 is a simplified schematic cross-sectional drawing of an alternative embodiment of the gas turbine engine system constructed in accordance with the present invention and showing a modulator ring defining a plurality of trailing-edge slots secured to surround a slotted exhaust end of an inner wall of a by-pass air duct.
Figure 4:
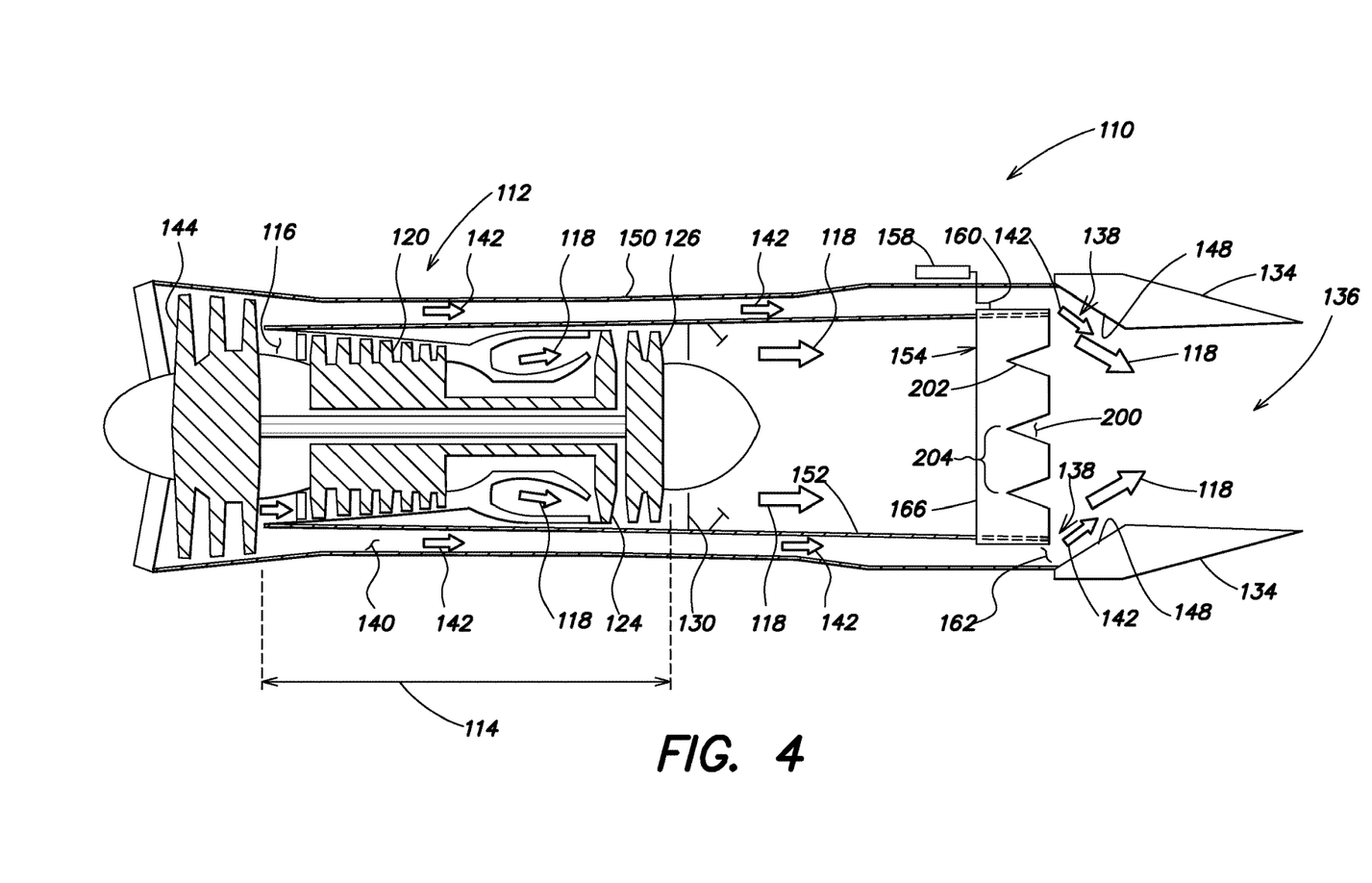
FIG. 4 is a simplified schematic cross-sectional drawing of the FIG. 3 gas turbine engine system showing the modulator ring circumferentially rotated so that trailing-edge slots in the modulator ring overlie trailing-edge slots in the slotted exhaust end.

FIGS. 3 and 4 show an alternative embodiment of the gas turbine engine system 10. For purposes of clarity and efficiency, the components of the FIGS. 3 and 4 embodiment of the gas turbine engine system that are virtually identical to those components described above with respect to FIGS. 1 and 2 are designated by reference numerals having one hundred added to each reference numeral. For example, the FIGS. 3 and 4 gas turbine engine system is designated by reference numeral 110, the gas turbine engine is 112, the core engine is 114, etc., and these component will not be described again with reference to the FIGS. 3 and 4 embodiment. Components that are in FIGS. 3 and 4 and that are not in FIGS. 1 and 2 will be designated by reference numerals starting with number 200.

As shown in FIGS. 3 and 4, the exhaust end 156 of the inner wall 152 of the by-pass air duct 140 defines a plurality of trailing-edge slots 200 extending from the exhaust end 156 upstream toward the low pressure turbine 126, and extending no further than an upstream end 166 of the overlying modulator ring 154. The modulator ring 154 also defines a corresponding plurality of trailing-edge slots 202 extending from a downstream end 164 of the modulator ring 154 upstream toward but not extending beyond the upstream end 166 of the modulator ring 154. Additionally, a blocking area 204 of the modulator ring is included between each of the plurality of trailing-edge slots 202 defined within the modulator ring 154, and each blocking area 204 is greater than an area of each of the trailing-edge slots 200 defined at the exhaust end 156 and within the inner wall 152 of the by-pass air duct 140. Therefore, whenever the modulator ring 154 is selectively rotated by the positional actuator 158 to a FIG. 3 restricted position (as shown in FIG. 3), the blocking areas 204 of the modulator ring 154 between each of the plurality of trailing-edge slots 202 completely overlies each of the plurality of trailing-edge slots 200 defined within the exhaust end 156 of the inner wall 152 of the by-pass air duct 140.

As shown in FIG. 4, whenever the modulator ring 154 is selectively rotated to an unrestricted position, the plurality of trailing-edge slots 202 defined within the modulator ring 154 overlies the plurality of trailing-edge slots 200 defined within the inner wall 152 of the by-pass air duct 140. The positional actuator 158 is configured to selectively move the modulator ring 154 from the FIG. 3. restricted position to the FIG. 4 unrestricted position, and any positions there between. This action modulates flow of the by-pass air 142 to pass either beyond the downstream end 164 of the modulator ring 154 or to pass partially through the plurality of trailing-edge slots 202, 200 defined within the modulator ring 154 and exhaust end 156 of the inner wall 152 of the by-pass air duct 140 and into the flow of the combusted core engine air 118 within the convergent nozzle section 138 of the gas turbine engine. It is pointed out that the plurality of trailing-edge slots 202, 200 defined within the modulator ring 154 and exhaust end 156 of the inner wall 152 of the by-pass air duct 140 present no obstructions to flow of the by-pass fan air 142 because the trailing-edge slots 202 defined within the modulator ring 154 define a slot-shaped downstream end 164 of the modulator ring 154, and the trailing-edge slots 200 defined within the exhaust end 156 of the inner wall 152 of the duct 140 define a slot-shaped exhaust end 156 of the inner wall 152.

In a further aspect of the FIGS. 3 and 4 gas turbine engine system 110, the exhaust end 156 of the inner wall 152 of the by-pass fan air duct 140 including the trailing-edge slots 200 define an air-duct exhaust passage 206 between the downstream end 164 of the modulator ring 154 and a convergent wall 148 of the convergent nozzle section 138. The air duct exhaust passage 206 defines an area open to flow of by-pass air 142 through the air duct exhaust passage 206. The area of the air duct exhaust passage 206 is decreased by about up to eighty percent as the modulator ring 154 is rotated from the FIG. 4 unrestricted position to the FIG. 3 restricted position. In the FIG. 4 unrestricted position, the trailing-edge slots 202 in the downstream end 164 of the modulator ring 154 are positioned to overlie the trailing-edge slots 200 in the exhaust end 156 of the inner wall 152 of the by-pass fan air duct 140.

FIGS. 3 and 4 also show that the plurality of trailing-edge slots 200 defined within the inner wall 152 of the by-pass air duct 140 and the corresponding plurality of trailing-edge slots 202 defined within the downstream end 164 of the modulator ring 154 may be in the shape of triangles 200, 202, wherein each triangle 200, 202 has its base adjacent and defining the exhaust end 156 and downstream end 164 of the inner wall 152 and modulator ring 154. This is best seen in FIG. 4, wherein the trailing-edge slots 200, 202 overlie each other. As seen in FIGS. 3 and 4, each triangle has a convergent point of two sides of each triangle farthest away from the exhaust end 156 and downstream end 164 of the inner wall 152 and modulator ring 154.

The disclosure also includes a method of modulating flow of by-pass fan air 42 and core engine air 18 within the gas turbine engine system 10 for minimizing loss of thrust generated by the rotating fan 44, and maximizing cooling of the convergent wall 48 of the convergent nozzle section 38 of the gas turbine engine 12. The method includes positioning the modulator ring 54 to surround the inner wall 52 of the by-pass air duct adjacent the exhaust end 56 of the inner wall 52 and adjacent the convergent nozzle section 38; reducing an area of an air-duct passage 62, 162 by selectively moving the modulator ring 54, 154 to one of circumferential rotation about the slotted exhaust end 156 of the inner wall 152 of the by-pass air duct 140, and longitudinal sliding along and beyond the exhaust end 56 of the inner wall 52 of the by-pass air duct 40; and, parallel linear flowing of the by-pass fan air 42, 142 and the core engine air 18, 118 into the convergent nozzle section 38, 138.

The method may also include reducing the area of the air-duct passage 62 by sliding the modulator ring 54 so that as a downstream end 64 of the modulator ring 54 slides beyond the exhaust end 56 of the inner wall 52 of the by-pass air duct 40 and as an upstream end 66 of the modulator ring 54 does not extend beyond the exhaust end 56 of the inner wall 52 of the by-pass air duct 40. The by-pass fan air 42 flows through the reduced area air-duct passage 62 into the convergent nozzle section 38 remaining as parallel linear with flow of the core engine air 18 into the convergent nozzle section 38.

FIGS. 3 and 4 illustrate another aspect of the method of modulating flow of the by-pass fan air 142 and core engine air 118 that includes selectively varying the area of the air-duct 162 passage by positioning a plurality of trailing-edge slots 200 defined within the exhaust end 156 of the inner wall 152 of the by-pass air duct 140 and adjacent the convergent nozzle section 138 of the gas turbine engine 112, and by circumferentially rotating the modulator ring 154 so that the plurality of trailing-edge slots 202 defined within and at a downstream end 164 of the modulator ring 154 and adjacent the convergent nozzle section 138 of the gas turbine engine 112 selectively overlie the trailing-edge slots 200 defined within the exhaust end 156 of the inner wall 152 of the by-pass air duct 40. This permits flow of the by-pass fan air 142 to pass through the overlying plurality of trailing-edge slots 202, 200 into the convergent nozzle section 138 and remain parallel linear with flow of the core engine air 118 into the convergent nozzle section 138. The flow of the by-pass fan air 142 passing through the increased area air-duct passage 162 remains as parallel linear flow because the plurality of trailing-edge slots 202, 200 defined within the downstream end 164 of the modulator ring 154 and within the exhaust end 156 of the duct 140 define the ends 164, 156 and therefore do not present any obstruction to flow of the by-pass fan air passing through the trailing-edge slots 202, 200 into the convergent nozzle section 138.

The present gas turbine engine system 10 provides for minimizing loss of thrust from the fan 44 during any decrease in flow of fan by-pass air 42, 142 because the modulating ring 54, 154 is secured adjacent the exhaust end 56, 156 of the inner wall 52, 152 of the by-pass fan air duct 40 140, and is also secured adjacent the convergent nozzle section 38, 138 of the gas turbine engine 138. As the air duct exhaust passage 62, 162 decreases in area thereby limiting flow of the by-pass fan air 42, 142, the fan air flow 42, 142 immediately flows into the convergent nozzle section 38, 138 of the engine 12, 112, which minimizes any pressure drop in the by-pass fan air flow 42, 142 because the flow of the engine core air 18, 118 within the engine convergent nozzle section 38, 138 is at a very high velocity compared to the by-pass fan air flow 42, 142. Additionally, because the by-pass fan air flow 42, 142 flows in parallel linear flow with the core engine air flow 18, 118 into the convergent nozzle section 38, 138, the cooler by-pass flow air 42, 142 will remain in generally laminar flow adjacent and along the convergent wall 48, 148 of the convergent nozzle section 38, 138, and the by-pass fan air flow 42 will turn together with the engine air flow 18 adjacent the convergent wall to minimize mixing of the two streams 18, 42. This will enhance cooling of the convergent wall 48, 148 compared to known gas turbine engines wherein the by-pass air flow and engine core air flow are mixed together and turned in non-parallel linear directions giving rise to turbulent flow, which produces substantial pressure drops and consequent loss of thrust, and diminished cooling of the convergent wall 48, 148.

While the above disclosure has been presented with respect to the described and illustrated embodiments of gas turbine engine system for modulating flow of fan by-pass air and core engine air, it is to be understood that other embodiments are within the scope of this disclosure. For example, while the gas turbine engine 12, 112 has been described with only one compressor and a minimal number of other components, it is to be understood that the present disclosure may include any by-pass gas turbine engine. Additionally, the disclosure may be utilized with a gas turbine engine having and augmentor, or with one having no augmentor. Accordingly, reference should be made primarily to the following claims rather than the foregoing description to determine the scope of the disclosure.

What is claimed is:

1. A gas turbine engine system for modulating flow of by-pass fan air and core engine air, the system comprising:
   a. a gas turbine engine including an engine core defining passageways for directing flow of the core engine air sequentially through a compressor, a combustor wherein the air is combusted with a fuel, a high pressure turbine, a low pressure turbine, out of the engine core, and optionally through and out of an augmentor, at an engine convergent nozzle section downstream from the low pressure turbine and optional augmentor, and including a by-pass fan air duct for directing flow of by-pass fan air from a fan rotated upstream of the compressor by the core engine, through the by-pass fan air duct surrounding the engine core and optional augmentor and out of an exhaust end of the fan air duct at the engine convergent nozzle section and for directing flow of by-pass fan air in a direction parallel linear with the flow of core engine air downstream from the low pressure turbine and within the engine convergent nozzle section;
   b. a modulator ring movably positioned to surround an inner wall of the by-pass air duct adjacent to an exhaust end of the inner wall of the by-pass air duct and adjacent the engine convergent nozzle section; and,
   c. a positional actuator mechanically linked to the modulator ring for selectively positioning the modulator ring by circumferential rotation about and overlying the exhaust end of the inner wall of the by-pass air duct, wherein the exhaust end of the inner wall of the by-pass air duct defines a plurality of trailing-edge slots extending from the exhaust end upstream toward the low pressure turbine, and extending no further than an upstream end of the overlying modulator ring, wherein the modulator ring defines a corresponding plurality of trailing-edge slots extending from a downstream end of the modulator ring upstream toward but not extending beyond the upstream end of the modulator ring, and wherein a blocking area of the modulator ring is included between each of the plurality of trailing-edge slots defined within the modulator ring and each blocking area is greater than an area of each of the trailing-edge slots defined adjacent the blocking area and within the inner wall of the by-pass air duct, so that whenever the modulator ring is rotated to a restricted position the blocking areas of the modulator ring between each of the plurality of trailing-edge slots completely overlies each of the plurality of trailing-edge slots defined within the exhaust end of the inner wall of the by-pass air duct, and so that whenever the modulator ring is rotated to an unrestricted position, the plurality of trailing-edge slots defined within the modulator ring overlies the plurality of trailing-edge slots defined within the inner wall of the by-pass air duct, and wherein the positional actuator is configured to selectively move the modulator ring from the restricted position to the unrestricted position, thereby modulating flow of the by-pass air to pass either beyond the downstream end of the modulator ring or to pass partially through the plurality of trailing-edge slots and into the flow of the combusted core engine air within the convergent nozzle section of the gas turbine engine.

2. The gas turbine engine system of claim 1, wherein a downstream end of the modulator ring defines a curved shape to assist turning of the fan air flow into the convergent nozzle section.

3. The gas turbine engine system of claim 1, wherein the exhaust end of the by-pass fan air duct defines an air-duct exhaust passage between the downstream end of the modulator ring and a convergent wall of the convergent nozzle section, the air duct exhaust passage defining an area open to flow of by-pass air through the air duct exhaust passage, and wherein the area of the air duct exhaust passage is decreased by up to eighty percent as the modulator ring is rotated from the unrestricted position to the restricted position.

4. The gas turbine engine system of claim 1, wherein the plurality of trailing-edge slots defined within the inner wall of the by-pass air duct and the corresponding plurality of trailing-edge slots defined within the downstream end of the modulator ring are in the shape of triangles, wherein each triangle has its base adjacent and defining the exhaust end and downstream end of the inner wall and modulator ring, and each triangle has a convergent point of two sides of each triangle farthest away from the exhaust end and downstream end of the inner wall and modulator ring.

5. A method of modulating flow of by-pass fan air and core engine air within the gas turbine engine system of claim 1 for minimizing loss of thrust generated by the rotating fan, and maximizing cooling of a convergent wall of the convergent nozzle section of the gas turbine engine, the method comprising;

a. positioning the modulator ring to surround the inner wall of the by-pass air duct adjacent the exhaust end of the inner wall and adjacent the convergent nozzle section;

b. reducing an area of an air-duct passage by selectively moving the modulator by circumferential rotation about and overlying the exhaust end of the inner wall of the by-pass air duct;

further comprising selectively varying the area of the air-duct passage by positioning a plurality of trailing-edge slots defined within the exhaust end of the inner wall of the by-pass air duct and adjacent the convergent nozzle section of the gas turbine engine, and by circumferentially rotating the modulator ring so that a plurality of trailing-edge slots defined within and at a downstream end of the modulator ring and adjacent the convergent nozzle section of the gas turbine engine selectively overlie the trailing-edge slots defined within the exhaust end of the inner wall of the by-pass air duct so that flow of the by-pass fan air through the plurality of trailing-edge slots into the convergent nozzle section is parallel linear with flow of the core engine air into the convergent nozzle section; and     c. parallel linear flowing of the by-pass fan air and the core engine air into the convergent nozzle section.

\* \* \* \* \*